(12) United States Patent
Jia et al.

(10) Patent No.: US 12,328,331 B1
(45) Date of Patent: Jun. 10, 2025

(54) DETECTION OF PRIVACY ATTACKS ON MACHINE LEARNING MODELS

(71) Applicant: HiddenLayer, Inc., Austin, TX (US)

(72) Inventors: Hengrui Jia, Toronto (CA); Ravikumar Balakrishnan, Beaverton, OR (US); Zeliang Kan, London (GB); Jason Martin, Beaverton, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 19/045,368

(22) Filed: Feb. 4, 2025

(51) Int. Cl.
*H04L 9/40* (2022.01)

(52) U.S. Cl.
CPC ...... *H04L 63/1425* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | |
|---|---|---|
| 7,802,298 B1 | 9/2010 | Hong et al. |
| 9,356,941 B1 | 5/2016 | Kislyuk et al. |
| 9,516,053 B1 | 12/2016 | Muddu et al. |
| 10,193,902 B1 | 1/2019 | Caspi et al. |
| 10,210,036 B2 | 2/2019 | Iyer et al. |
| 10,462,168 B2 | 10/2019 | Shibahara et al. |
| 10,637,884 B2 | 4/2020 | Apple et al. |
| 10,673,880 B1 | 6/2020 | Pratt et al. |
| 10,764,313 B1 | 9/2020 | Mushtaq |
| 10,803,188 B1 | 10/2020 | Rajput et al. |
| 11,310,270 B1 | 4/2022 | Weber et al. |
| 11,483,327 B2 | 10/2022 | Hen et al. |
| 11,501,101 B1 | 11/2022 | Ganesan et al. |
| 11,551,137 B1 | 1/2023 | Echauz et al. |
| 11,601,468 B2 | 3/2023 | Angel et al. |
| 11,710,067 B2 | 7/2023 | Harris et al. |
| 11,762,998 B2 | 9/2023 | Kuta et al. |
| 11,777,957 B2 | 10/2023 | Chen et al. |
| 11,875,130 B1 | 1/2024 | Bosnjakovic et al. |

(Continued)

OTHER PUBLICATIONS

Dinan et al., 2021, "Anticipating safety issues in e2e conversational ai: Framework and tooling," ar Xiv preprint arXiv:2107.03451v3 (43 pages).

(Continued)

*Primary Examiner* — Joseph P Hirl
*Assistant Examiner* — Hassan Saadoun
(74) *Attorney, Agent, or Firm* — Jones Day

(57) ABSTRACT

A plurality of queries are input into an artificial intelligence (AI) model. The AI model is made up of a plurality of layers including an input layer, an output layer, and at least one intermediate layer between the input layer and the output layer. Each intermediate layer, during inference, can output a plurality of activations. Thereafter, for each query, activations are intercepted from at least one of the intermediate layers. It is then determined whether a distribution of the intercepted activations across the queries indicates that the queries seek to cause the AI model to behave in an undesired manner by conducting a distance-based similarity analysis between the intercepted activations and reference activations. Data characterizing such determination is then provided to a consuming application or process. Related apparatus, systems, techniques and articles are also described.

29 Claims, 14 Drawing Sheets

(56) References Cited

U.S. PATENT DOCUMENTS

| | | |
|---|---|---|
| 11,893,111 B2 | 2/2024 | Sai et al. |
| 11,893,358 B1 | 2/2024 | Lakshmikanthan et al. |
| 11,930,030 B1 | 3/2024 | Burns et al. |
| 11,930,039 B1 | 3/2024 | Geethakumar et al. |
| 11,954,199 B1 | 4/2024 | Burns et al. |
| 11,960,514 B1 | 4/2024 | Taylert et al. |
| 11,962,546 B1 | 4/2024 | Hattangady et al. |
| 11,971,914 B1 | 4/2024 | Watson et al. |
| 11,972,333 B1 | 4/2024 | Horesh et al. |
| 11,995,180 B1 | 5/2024 | Cappel et al. |
| 11,997,059 B1 | 5/2024 | Su et al. |
| 12,130,917 B1 | 5/2024 | Yeung et al. |
| 12,174,954 B1 | 5/2024 | Yeung et al. |
| 12,026,255 B1 | 7/2024 | Burns et al. |
| 12,105,844 B1 | 10/2024 | Burns et al. |
| 12,107,885 B1 | 10/2024 | Kawasaki et al. |
| 12,111,926 B1 | 10/2024 | Beveridge et al. |
| 12,124,592 B1 | 10/2024 | O'Hern et al. |
| 12,130,943 B1 | 10/2024 | Burns et al. |
| 12,137,118 B1 | 11/2024 | Kawasaki et al. |
| 12,182,264 B2 | 12/2024 | Sinha et al. |
| 12,197,859 B1 | 1/2025 | Malviya et al. |
| 12,204,323 B1 | 1/2025 | Malviya et al. |
| 12,229,265 B1 | 2/2025 | Yeung et al. |
| 12,248,883 B1 | 3/2025 | Rideout et al. |
| 2010/0082811 A1 | 4/2010 | Van Der Merwe |
| 2014/0033307 A1 | 1/2014 | Schmidtler |
| 2014/0157415 A1 | 6/2014 | Abercrombie et al. |
| 2015/0074392 A1 | 3/2015 | Boivie et al. |
| 2016/0344770 A1 | 11/2016 | Verma et al. |
| 2017/0154021 A1 | 6/2017 | Vidhani et al. |
| 2017/0251006 A1 | 8/2017 | LaRosa et al. |
| 2017/0331841 A1 | 11/2017 | Hu et al. |
| 2018/0018590 A1 | 1/2018 | Szeto et al. |
| 2018/0063190 A1 | 3/2018 | Wright et al. |
| 2018/0205734 A1 | 7/2018 | Wing et al. |
| 2018/0219888 A1 | 8/2018 | Apostolopoulos |
| 2018/0324193 A1 | 11/2018 | Ronen et al. |
| 2019/0050564 A1 | 2/2019 | Pogorelik et al. |
| 2019/0238568 A1* | 8/2019 | Goswami ............... G06F 21/566 |
| 2019/0238572 A1 | 8/2019 | Manadhata et al. |
| 2019/0260784 A1 | 8/2019 | Stockdale et al. |
| 2019/0311118 A1 | 10/2019 | Grafi et al. |
| 2019/0392176 A1 | 12/2019 | Taron et al. |
| 2020/0019721 A1 | 1/2020 | Shanmugam et al. |
| 2020/0076771 A1 | 3/2020 | Maier et al. |
| 2020/0175094 A1 | 6/2020 | Palmer et al. |
| 2020/0219009 A1 | 7/2020 | Dao et al. |
| 2020/0233979 A1 | 7/2020 | Maraghoosh et al. |
| 2020/0285737 A1 | 9/2020 | Kraus et al. |
| 2020/0313849 A1* | 10/2020 | Kar ........................ G06N 3/08 |
| 2020/0364333 A1* | 11/2020 | Derks ..................... G06F 21/52 |
| 2020/0409323 A1 | 12/2020 | Spalt et al. |
| 2021/0110062 A1 | 4/2021 | Oliner et al. |
| 2021/0141897 A1 | 5/2021 | Seifert et al. |
| 2021/0209464 A1 | 7/2021 | Bala et al. |
| 2021/0224425 A1 | 7/2021 | Nasr-Azadani et al. |
| 2021/0303695 A1 | 9/2021 | Grosse et al. |
| 2021/0319098 A1* | 10/2021 | Pogorelik ............... G06N 3/045 |
| 2021/0319784 A1 | 10/2021 | Le Roux et al. |
| 2021/0357508 A1 | 11/2021 | Elovici et al. |
| 2021/0374247 A1 | 12/2021 | Sultana et al. |
| 2021/0407051 A1 | 12/2021 | Pardeshi et al. |
| 2022/0030009 A1 | 1/2022 | Hasan |
| 2022/0058444 A1 | 2/2022 | Olabiyi et al. |
| 2022/0070195 A1 | 3/2022 | Sern et al. |
| 2022/0083658 A1 | 3/2022 | Shah et al. |
| 2022/0114399 A1 | 4/2022 | Castiglione et al. |
| 2022/0147597 A1 | 5/2022 | Bhide et al. |
| 2022/0164444 A1 | 5/2022 | Prudkovskij et al. |
| 2022/0166795 A1 | 5/2022 | Simioni et al. |
| 2022/0182410 A1 | 6/2022 | Tupsamudre et al. |
| 2022/0253464 A1 | 8/2022 | Sloane et al. |
| 2022/0269796 A1 | 8/2022 | Chase et al. |
| 2022/0284283 A1* | 9/2022 | Yin ........................ G06N 3/04 |
| 2022/0309179 A1 | 9/2022 | Payne et al. |
| 2023/0008037 A1 | 1/2023 | Venugopal et al. |
| 2023/0027149 A1 | 1/2023 | Kuan et al. |
| 2023/0049479 A1 | 2/2023 | Mozo Velasco et al. |
| 2023/0109426 A1 | 4/2023 | Hashimoto et al. |
| 2023/0128947 A1 | 4/2023 | Bhaskar et al. |
| 2023/0148116 A1 | 5/2023 | Stokes et al. |
| 2023/0169397 A1 | 6/2023 | Smith et al. |
| 2023/0185912 A1 | 6/2023 | Sinn et al. |
| 2023/0185915 A1 | 6/2023 | Rao et al. |
| 2023/0208869 A1 | 6/2023 | Bisht et al. |
| 2023/0229960 A1 | 7/2023 | Zhu et al. |
| 2023/0252178 A1 | 8/2023 | Ruelke et al. |
| 2023/0259787 A1 | 8/2023 | David et al. |
| 2023/0269263 A1 | 8/2023 | Yarabolu |
| 2023/0274003 A1* | 8/2023 | Liu ........................ G06N 3/094 |
| | | 726/26 |
| 2023/0289604 A1 | 9/2023 | Chan et al. |
| 2023/0351143 A1 | 11/2023 | Kutt et al. |
| 2023/0359903 A1 | 11/2023 | Cefalu et al. |
| 2023/0359924 A1 | 11/2023 | Maman et al. |
| 2023/0385085 A1 | 11/2023 | Singh |
| 2023/0388324 A1 | 11/2023 | Thompson |
| 2024/0022585 A1 | 1/2024 | Burns et al. |
| 2024/0031026 A1* | 1/2024 | Fujisawa ............ H04B 10/2507 |
| 2024/0039948 A1 | 2/2024 | Koc et al. |
| 2024/0045959 A1 | 2/2024 | Marson et al. |
| 2024/0078337 A1 | 3/2024 | Kamyshenko et al. |
| 2024/0080333 A1 | 3/2024 | Burns et al. |
| 2024/0126611 A1 | 4/2024 | Phanishayee et al. |
| 2024/0127065 A1* | 4/2024 | Ren ........................ G06N 3/088 |
| 2024/0160902 A1 | 5/2024 | Padgett et al. |
| 2024/0289628 A1 | 8/2024 | Parmar et al. |
| 2024/0289863 A1 | 8/2024 | Smith Lewis et al. |
| 2024/0296315 A1 | 9/2024 | Singh et al. |
| 2024/0386103 A1 | 11/2024 | Clement et al. |
| 2024/0414177 A1 | 12/2024 | Lal et al. |
| 2024/0427986 A1 | 12/2024 | Shakarian et al. |
| 2025/0086455 A1* | 3/2025 | Yang ...................... G06N 3/045 |

OTHER PUBLICATIONS

Morozov et al., 2019, "Unsupervised Neural Quantization for Compressed-Domain Similarity Search," International Conference on Computer Vision (ICCV) 2019 (11 pages).

Rijthoven et al., 2021, "HookNet: Multi-resolution convulational neural networks for semantic segmentation in histopathology whole-slide images," Medical Imange Analysis 68:1-10 (10 pages).

Abadi et al., 2016, "Deep Learning with Differential Privacy," arXiv:1607.00133v2 [stat.ML] Oct. 24, 2016 (14 pages).

Carlini et al., 2021, "Extracting Training Data from Large Language Models," arXiv:2012.07805v2 [cs.CR] Jun. 15, 2021 (19 pages).

Chao et al., 2023, "Jailbreaking black box large language models in twenty queries," University of Pennsylvania, Available online at: https://arxiv.org/abs/2211.09527 (21 pages).

Choquette-Choo et al., 2021, "Label-Only Membership Inference Attacks," arXiv:2007.14321v3 [cs.CR] Dec. 5, 2021 (17 pages).

Goodfellow et al., 2015, "Explaining and harnessing adversarial examples," 3rd International Conference on Learning Representations, ICLR 2015, Available online at: http://arxiv.org/abs/1412.6572 (11 pages).

Heusel et al., 2018, "GANs Trained by a Two Time-Scale Update Rule Converge to a Local Nash Equilibrium," arXiv:1706.08500v6 [cs.LG] Jan. 12, 2018 (38 pages).

Hu et al., 2021, "LoRA: Low-rank adaptation of large language models," arXiv:2106.09685v2 [cs.CL] Oct. 16, 2021 (26 pages).

Hu et al., 2022, "LoRA: Low-rank adaptation of large language models," International Conference on Learning Representations, Available online at: https://openreview.net/forum?id=nZeVKeeFYf9 (13 pages).

Imoxto, 2024, "prompt injection cleaned dataset-v2," Hugging Face, available online at: https://huggingface.co/datasets/imoxto/prompt_injection_cleaned_datasetv2 (3 pages).

Jiang et al., 2023, "Mistral 7b," Available online at: https://mistral.ai/news/announcing-mistral-7b (9 pages).

(56) References Cited

OTHER PUBLICATIONS

Kahla et al., 2022, "Label-Only Model Inversion Attacks via Boundary Repulsion," arXiv:2203.01925v1 [cs.LG] Mar. 3, 2022 (13 pages).

Ke et al., 2017, "Lightgbm: a highly efficient gradient boosting decision tree," Proceedings of the 31st International Conference on Neural Information Processing Systems (9 pages).

Ko et al., 2023, "PrivMon: A Stream-Based System for Real-Time Privacy Attack Detection for Machine Learning Models," Raid 2023 https://doi.org/10.1145/3607199.3607232 (18 pages).

Lee et al., 2023, "Wizardvicunalm," Available online at: https://github.com/melodysdreamj/Wizard VicunaLM (6 pages).

Lee, 2023, "ChatGPT DAN," ChatGPT DAN, Jailbreaks prompt, Available online at: https://github.com/0xk1h0/ChatGPT_DAN (3 pages).

Li et al., 2021, "Membership Leakage in Label-Only Exposures," arXiv:2007.15528v3 [cs.LG] Sep. 17, 2021 (17 pages).

Li et al., 2022, "Blacklight: Scalable Defense for Neural Networks against Query-Based Black-Box Attacks," Proceedings of the 31st Usenix Security Symposium (19 pages).

Lian et al., 2023. "Openorca: An open dataset of gpt augmented flan reasoning traces," Hugging Face, Available online at: https://huggingface.co/Open-Orca/OpenOrca (8 pages).

Liu et al., 2015, "Deep Learning Face Attributes in the Wild," arXiv:1411.7766v3 [cs.CV] Sep. 24, 2015 (11 pages).

Luo et al., 2024, "Jailbreakv-28k: A benchmark for assessing the robustness of multimodal large language models against jailbreak attacks," Available online at: https://arxiv.org/abs/2404.03027 (20 pages).

MacDiarmid et al., 2024, "Simple probes can catch sleeper agents," Available online at: https://www.anthropic.com/news/probescatch-sleeper-agents (18 pages).

Madry et al., 2019, "Towards Deep Learning Models Resistant to Adversarial Attacks," arXiv:1706.06083v4 [stat.ML] Sep. 4, 2019 (28 pages).

Mattern et al., 2023, "Membership Inference Attacks against Language Models via Neighborhood Comparison," arXiv:2305.18462v2 [cs. CL] Aug. 7, 2023 (12 pages).

Mireshghallah et al., 2022, "Quantifying Privacy Risks of Masked Language Models Using Membership Inference Attacks," arXiv:2203.03929v2 [cs.LG] Nov. 4, 2022 (16 pages).

Perez et al., 2022, "Ignore previous prompt: Attack techniques for language models," NeurIPS ML Safety Workshop, 36th Conference on Neural Information Processing System (NeurIPS2022), Available online at: https://openreview.net/forum?id=giaRo_7Zmug (21 pages).

Raman et al., 2023, "Model-tuning via prompts makes NLP models adversarially robust," The 2023 Conference on Empirical Methods in Natural Language Processing, Available online at: https://openreview.net/forum?id=R4yb4m7Nus (21 pages).

Salimans et al., 2016, "Improved Techniques for Training GANs," arXiv:1606.03498v1 [cs.LG] Jun. 10, 2016 (10 pages).

Schulhoff et al., 2023, "Ignore this title and hackAPrompt: Exposing systemic vulnerabilities of LLMs through a global prompt hacking competition," The 2023 Conference on Empirical Methods in Natural Language Processing, Available online at: https://openreview.net/forum?id=hcDE6sOEfu (33 pages).

Sujet-Ai, 2024, "Sujet finance dataset," Huging Face, https://huggingface.co/datasets/sujetai/Sujet-Finance-Instruct-177k (6 pages).

Templeton et al., 2024, "Scaling monosemanticity: Extracting interpretable features from claude 3 sonnet," Transformer Circuits Thread, Available online at: https://transformer-circuits.pub/2024/scalingmonosemanticity/index.html (75 pages).

Touvron et al., 2023, "Llama 2: Open foundation and fine-tuned chat models," Available online at: https://arxiv.org/abs/2307.09288 (77 pages).

Zhang et al., 2020, "The Secret Revealer: Generative Model-Inversion Attacks Against Deep Neural Networks," https://arxiv.org/abs/1911.07135 (9 pages).

Zhang et al., 2024, "Tinyllama: An open-source small language model," Available online at: https://arxiv.org/abs/2401.02385 (10 pages).

Zheng et al., 2023, "Judging LLM-as-a-judge with MT-bench and chatbot arena," Thirty-seventh Conference on Neural Information Processing Systems Datasets and Benchmarks Track, Available online at: https://openreview.net/forum?id=uccHPGDlao (29 pages).

Zou et al., 2023, "Representation engineering: A top-down approach to ai transparency," Available online at: https://arxiv.org/abs/2310.01405 (55 pages).

Zou et al., 2023, "Universal and transferable adversarial attacks on aligned language models," Available online at: https://arxiv.org/abs/2307.15043 (31 pages).

* cited by examiner

DETECTION OF PRIVACY ATTACKS ON MACHINE LEARNING MODELS

TECHNICAL FIELD

The subject matter described herein relates to techniques for detecting attacks on machine learning models to prevent such machine learning models from leaking sensitive information or otherwise operating in an undesired manner.

BACKGROUND

Machine learning (ML) is rapidly advancing and being widely applied across various domains. Training ML models typically leverage valuable datasets that often contain private and sensitive information. Adversaries (i.e., malicious actors) may exploit this arrangement through privacy attacks to extract such information from the ML models. For instance, research has demonstrated the feasibility of reconstructing facial data used in training face recognition models or extracting Personally Identifiable Information (PII) from language models. Although techniques such as differentially private training exist to defend against these attacks, they are often costly to implement and can significantly degrade model performance. As a result, ML model trainers frequently avoid deploying such techniques in favor of more rapid model responses. Moreover, differential privacy training methods typically require substantial modifications to the training process, making it impractical for third parties—who lack access to the training pipeline—to assist in their implementation.

SUMMARY

In a first aspect, a plurality of queries are input into an artificial intelligence (AI) model. The AI model is made up of a plurality of layers including an input layer, an output layer, and at least one intermediate layer between the input layer and the output layer. Each intermediate layer, during inference, can output a plurality of activations. Thereafter, for each query, activations are intercepted from at least one of the intermediate layers. It is then determined whether a distribution of the intercepted activations across the queries indicates that the queries seek to cause the AI model to behave in an undesired manner by conducting a distance-based similarity analysis between the intercepted activations and reference activations. Data characterizing such determination is then provided to a consuming application or process.

The distance-based similarity analysis can be based on a Fréchet distance analysis.

The AI model can include one or more neural networks.

The techniques can be confirm that the AI model does not behave in an undesired manner which can include leaking privacy information originating from a training data set of the AI model.

The reference activations can comprise distributions of activations empirically derived using the AI model. The reference activations can be generated from queries known to be benign. The reference activations can be generated from queries known to be malicious. The reference activations can be further generated from queries known to be benign such that the similarity analysis is conducted relative to both reference activations known to be benign and reference activations known to be malicious.

The reference activations can be approximated distributions of activations. The approximated distribution of layers can be generated using a batch normalization layer initialization provided as part of the model. The approximated distribution of layers can be generated using public data having a distribution similar to a training data set used to train the AI model. The approximated distribution of layers can be generated by initializing activations with random noise.

In some variations, activations approximating a training data set used by the AI model can be initialized. These initialized activations can be optimized in order to generate outputs having a certainty likelihood above a pre-defined level. The optimizing can be performed, for example, using one or more adversarial data generation techniques.

The query can encapsulate different types of attacks including a privacy attack. In this scenario, not only can the attack be identified, by the a training point in a training data set used to train the AI model can be identified as being targeted by the privacy attack. Different techniques can be used to determine the attacked training point. One example includes identifying, for each training point in the training data set, k-nearest neighboring activations associated with an activation for the training point. Then, for each training point in the training data set, an average distance from the activation for the training point to the identified k-nearest neighboring activations can be computed. It can then be determined that at least one of the queries includes an activation within the average distance for a particular training point. This particular training point can be flagged as being targeted by the privacy attack.

The distance-based similarity analysis between the intercepted activations and reference activations can include generating a first metric which characterizes overall divergence between the intercepted activations and the reference activations in combination with generating a second metric which groups queries by class predictions and calculates a distance for each group relative to reference activations of a same class. In some variations, the consuming application or process initiates a remediation action (e.g., prevent the query from being input, modifying the query, preventing an output of the AI model corresponding to the query from being returned, etc.) when the first metric is above a first threshold and the second metric is above a second threshold. The first metric can be based on a Fréchet distance and the second metric can be based on a class-conditioned Fréchet distance.

In some variations, the AI model can be a large language model and each of the queries can be or otherwise include a prompt. With this arrangement, a function call name can be identified for each prompt. These function call names can be used as or otherwise correspond to classes used by the class-conditioned Fréchet distance operation.

At least one of the first threshold and the second threshold can be calculated by constructing benign and adversarial queries and optimizing for a cost function. The cost function can take various forms including an F1 score.

At least one of the first threshold and the second threshold can be calculated by constructing benign queries and setting the corresponding threshold to be greater than a distance observed with the benign queries.

The reference activations, in some variations, can comprise surrogate activations having a dimensionality lower than activations associated with the AI model. With such cases, a surrogate model corresponding to the AI model can be used to make a determination as to whether the queries seek to cause the AI model to behave in an undesired manner.

The consuming application or process can initiate at least one remediation action based on the provided data. The at least one remediation can take various forms including preventing a subsequent query from being input into the AI model, flagging the query as being malicious, modifying a subsequent query from the requester to be benign, blocking a requester (by way of, for example, an internet protocol (IP) address, etc.).

In an interrelated aspect, each of a plurality of queries are input into an artificial intelligence (AI) model. The AI model includes a plurality of layers including an input layer, an output layer, and at least one intermediate layer between the input layer and the output layer. With this model, each intermediate layer, during inference, outputs a plurality of activations. Activations for each query are intercepted from at least one of the intermediate layers. A first metric is generated based on Fréchet distance is calculated using the intercepted activations and reference activations. Further, a second metric is generated based on a class-condition Fréchet distance using the intercepted activations and the reference activations, a second metric based on a class-conditioned Fréchet distance. A remediation to protect the AI model from a privacy attack is initiated when the first metric is above a first threshold and the second metric is above a second threshold.

In a further interrelated aspect, each of a plurality of queries are input into an artificial intelligence (AI) model. The AI model includes a plurality of layers including an input layer, an output layer, and at least one intermediate layer between the input layer and the output layer. Each intermediate layer is configured to output a plurality of activations during inference. Activations from at least one of the intermediate layers are intercepted for each query. It is determined whether a distribution of the intercepted activations across the queries indicates that the queries seek to cause the AI model to behave in an undesired manner by conducting a distance-based similarity analysis between the intercepted activations and reference activations. Based on this determination, a data point in a training set used to train the AI model is identified as being subject to a privacy attack. Data characterizing the identified data point can be provided to a consuming application or process.

In still a further interrelated aspect, each of a plurality of queries of an artificial intelligence (AI) model are intercepted (or otherwise redirected). The intercepted queries are input into a surrogate model corresponding to the AI model. The surrogate model includes a plurality of layers including an input layer, an output layer, and at least one intermediate layer between the input layer and the output layer. Each intermediate layer is configured, during inference, to output a plurality of surrogate activations. The surrogate model is a more compact representation of the AI model to allow for more computationally efficient analysis of AI model queries. Surrogate activations are intercepted from at least one of the intermediate layers for each query. It is then determined whether a distribution of the intercepted surrogate activations across the queries indicates that the queries seek to cause the AI model to behave in an undesired manner by conducting a distance-based similarity analysis between the intercepted surrogate activations and reference surrogate activations. Data characterizing such determination can be provided to a consuming application or process.

Non-transitory computer program products (i.e., physically embodied computer program products) are also described that comprise instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to identify and stop adversarial query injection attacks seeking to leak sensitive information on deep neural networks models including large language models. The current techniques outperform conventional methods by reducing computational costs associated with model inference/protection and achieving significantly lower false positive rates, even in cases where benign queries are highly similar. Further, the current subject matter is also technically advantageous in that it provides additional information about the potential targets of the attacks, offering greater interpretability and actionable insights.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for identifying and preventing cyberattacks on advanced artificial intelligence (AI) models including large language models (LLMs). In particular, the current subject matter is directed to analyzing intermediate results associated with queries (e.g., prompts, etc.) to determine whether such queries are malicious (e.g., elicit private or other sensitive training data, etc.) or benign. With these determinations, remediation actions can be taken in connection with the query including blocking the query, modifying the query, disconnecting the requesting device, disconnecting the account, and the like.

More specifically, the current subject matter provides techniques for analyzing distributions of benign versus malicious queries and using distance-based measurements to determine whether a query seeks to cause an AI model to perform in an undesired manner (e.g., leak private information, etc.).

Figure 1:
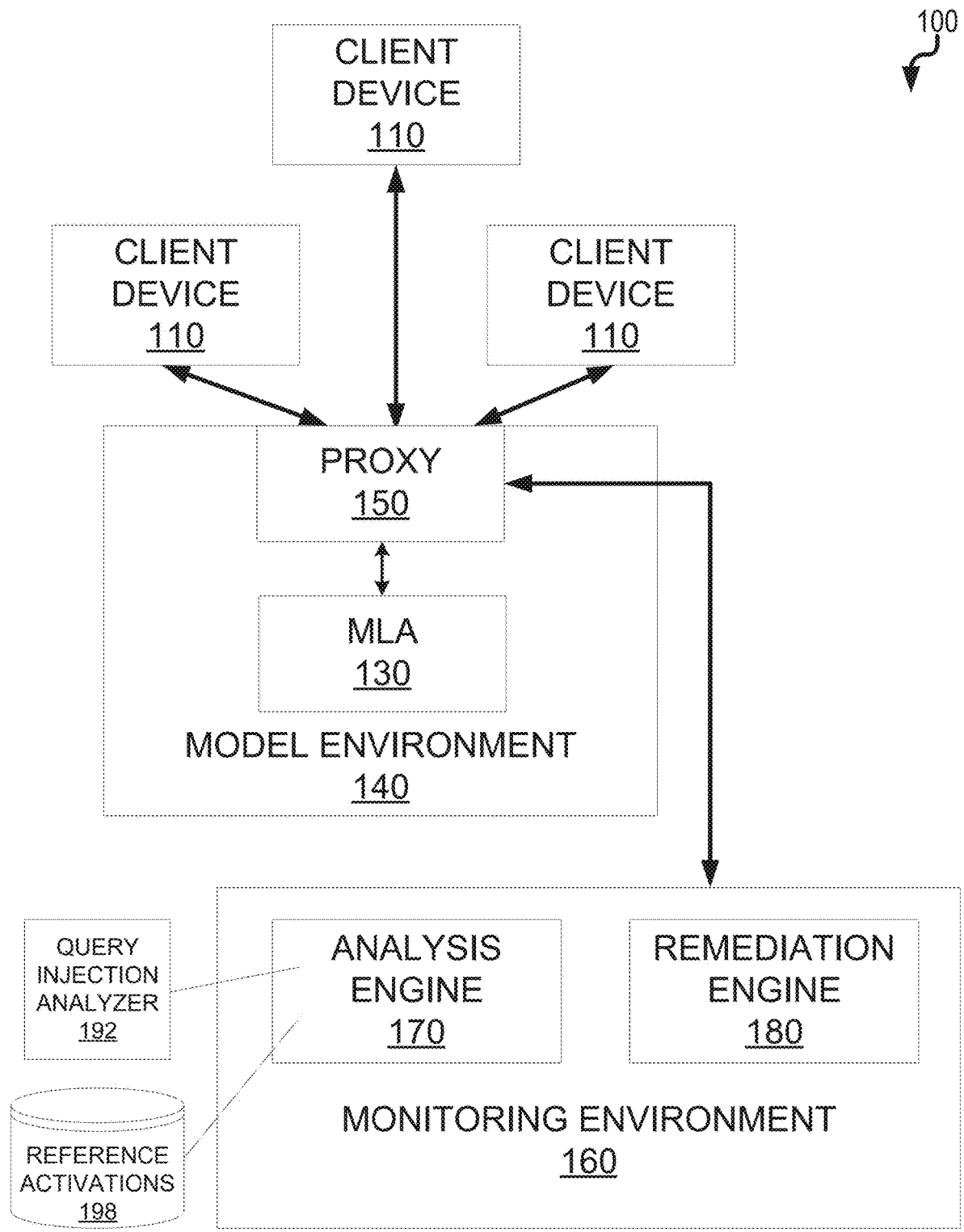
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. It will be appreciated that querying the MLA 130 can refer to querying one or more machine learning models which form part of the MLA 130. These queries can include or otherwise characterize various information including prompts ((e.g., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130. The analysis engine 170 can execute a query injection analyzer 192 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The analysis engine 152 and/or the query injection analyzer 192 (directly or indirectly) can access a data store 198 which, in some variations, comprises reference activations (further details of which are described below).

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
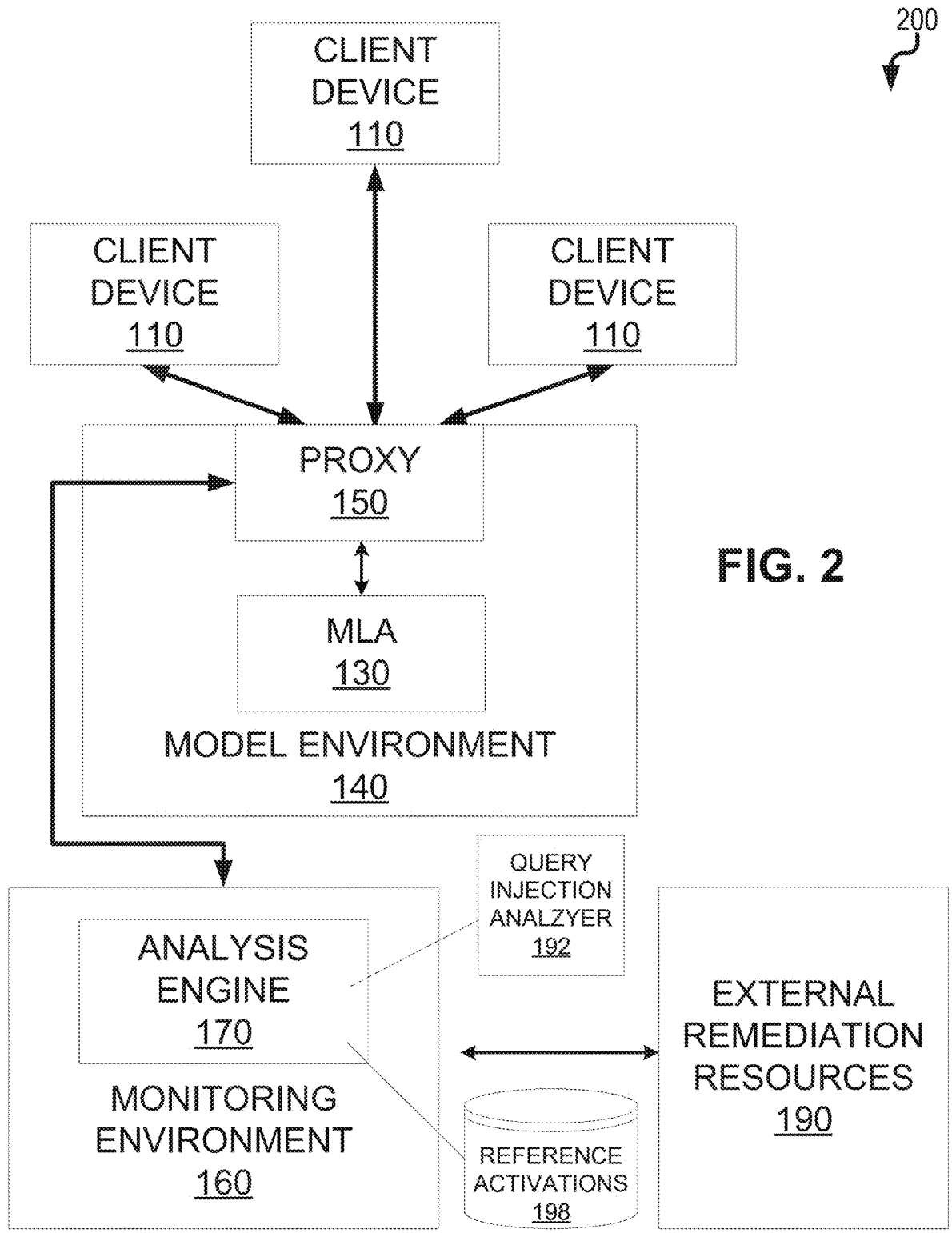
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
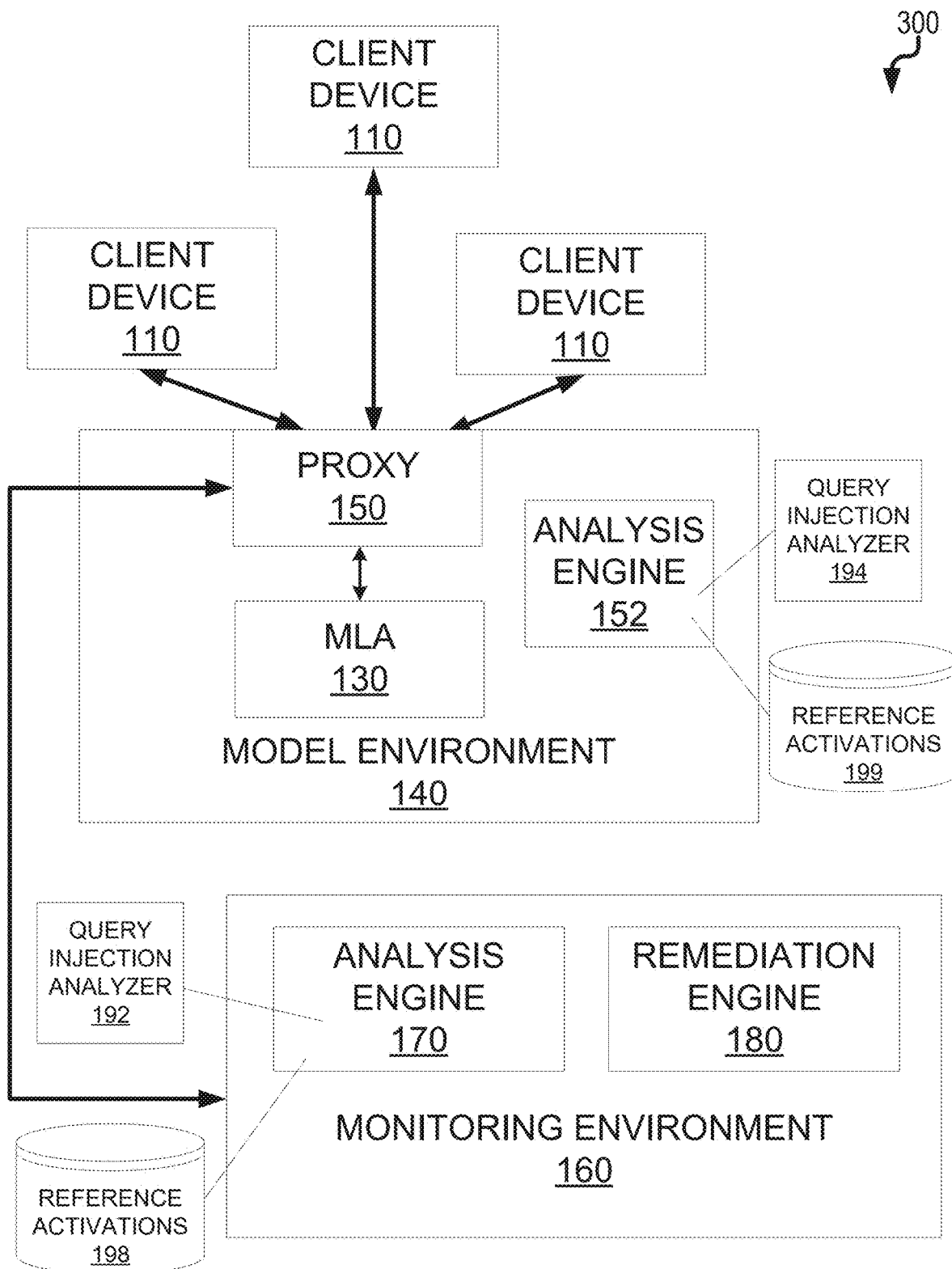
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170. The analysis engine 152 can execute a query injection analyzer 194 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The algorithms, detection logic and/or machine learning models forming part of the query injection analyzer 194 can, in some variations, be the same as those in the query injection analyzer 192. In other variations, the query injection analyzer 194 comprises or executes different algorithms, detection logic, and/or machine learning models than the query injection analyzer 192. The analysis engine 152 and/or the query injection analyzer 194 (either directly or indirectly) can access a data store 199 which, in some variations, comprises reference activations (further details of which are described below).

Figure 4:
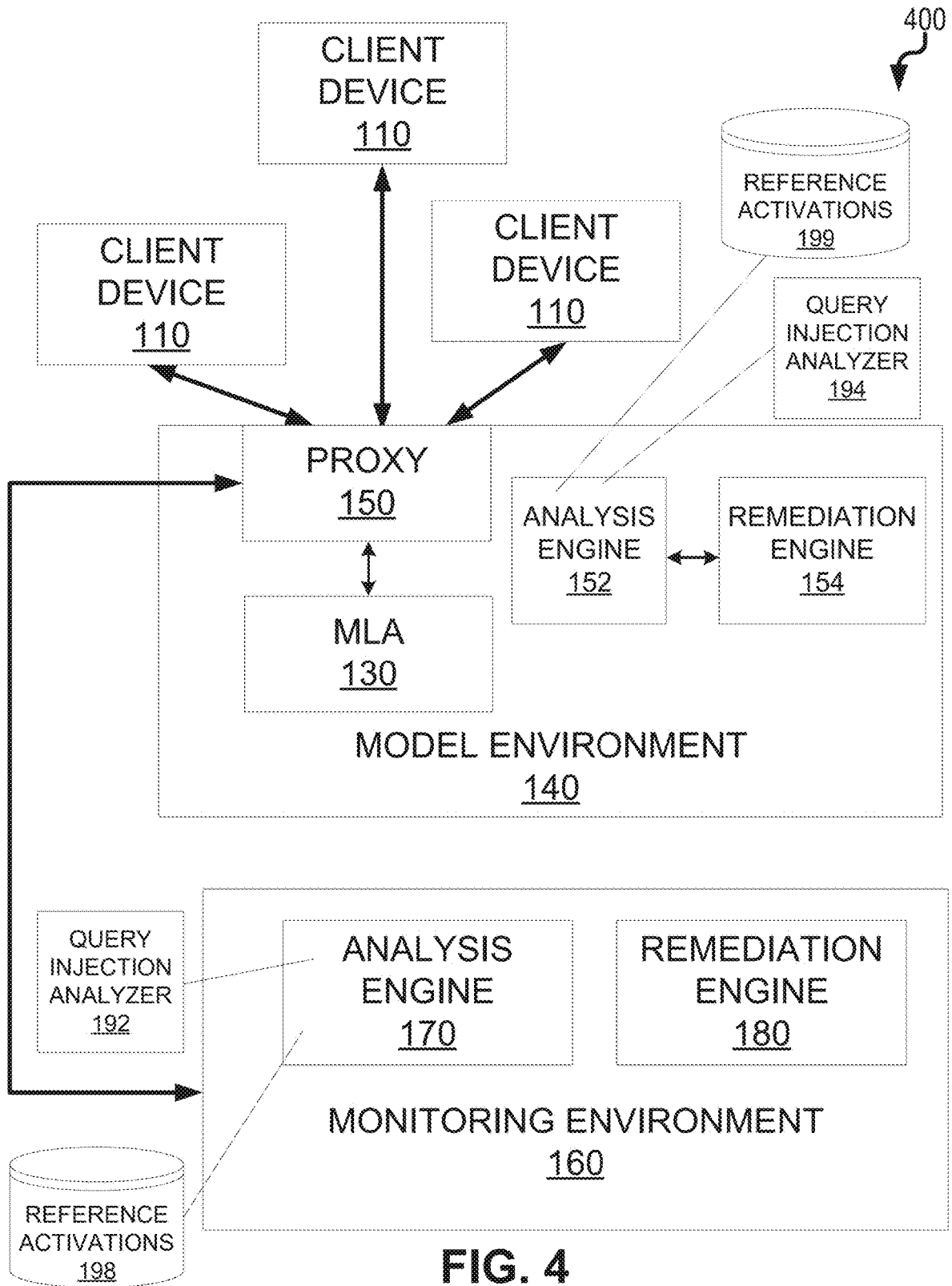
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
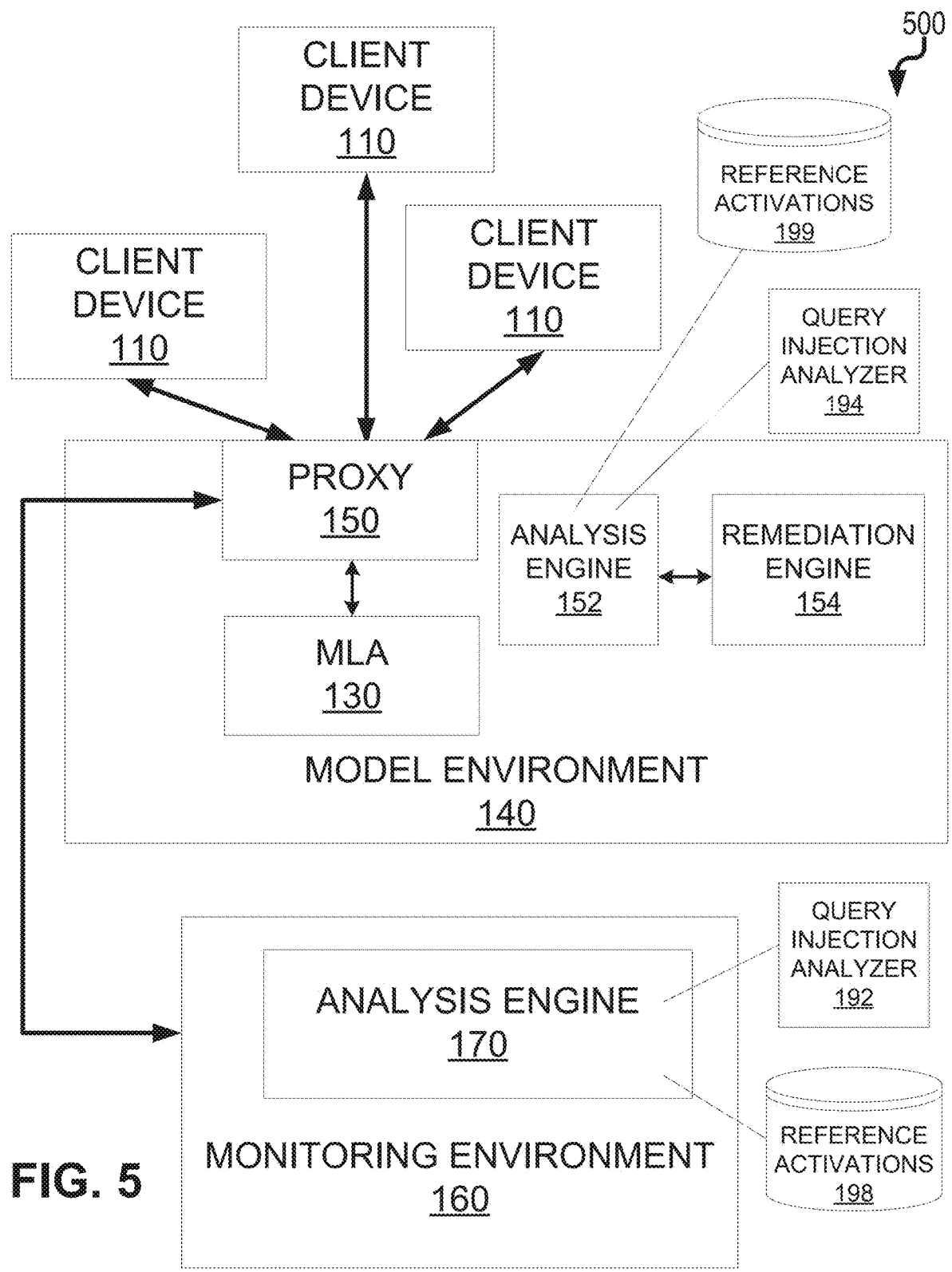
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
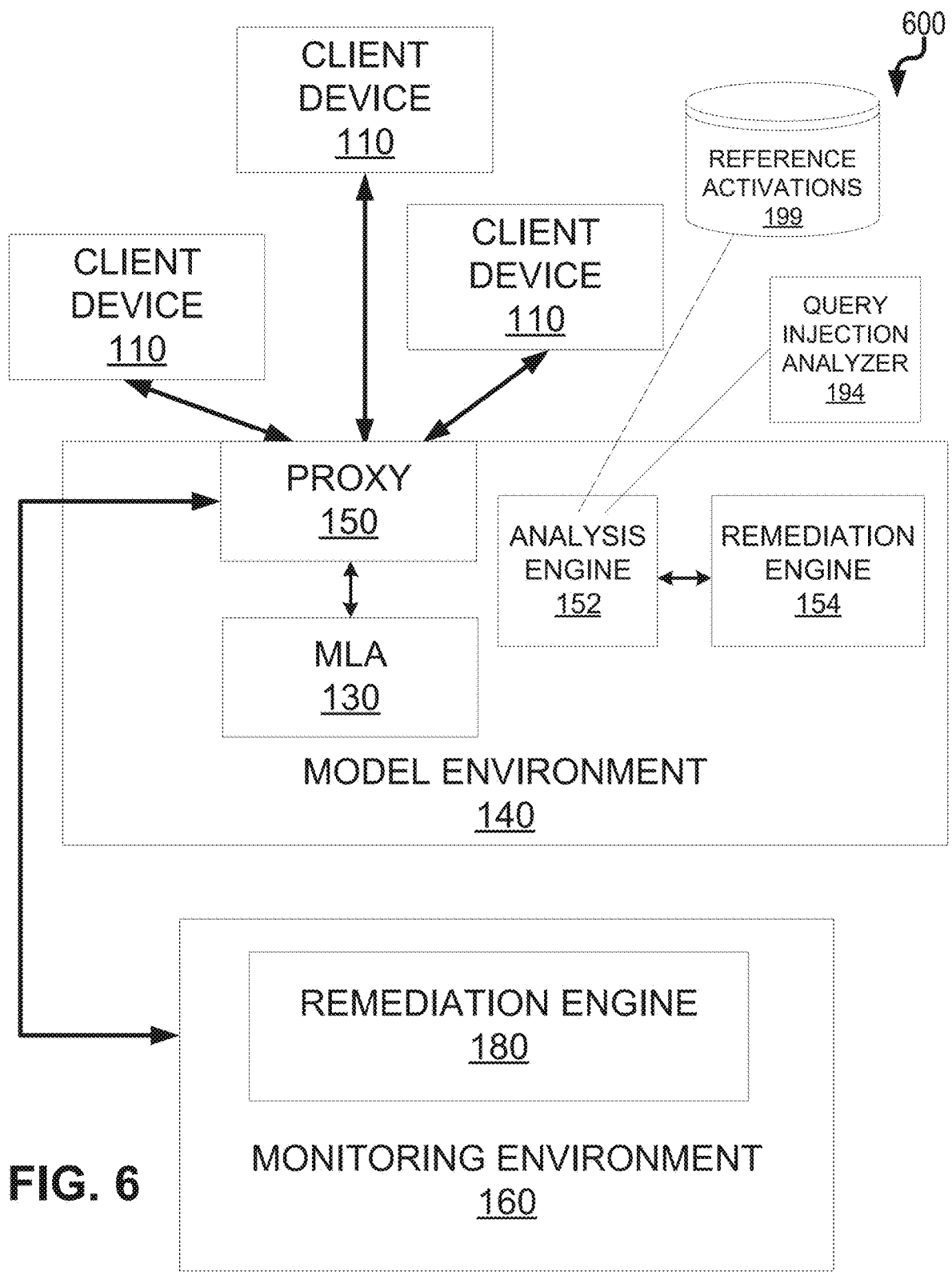
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
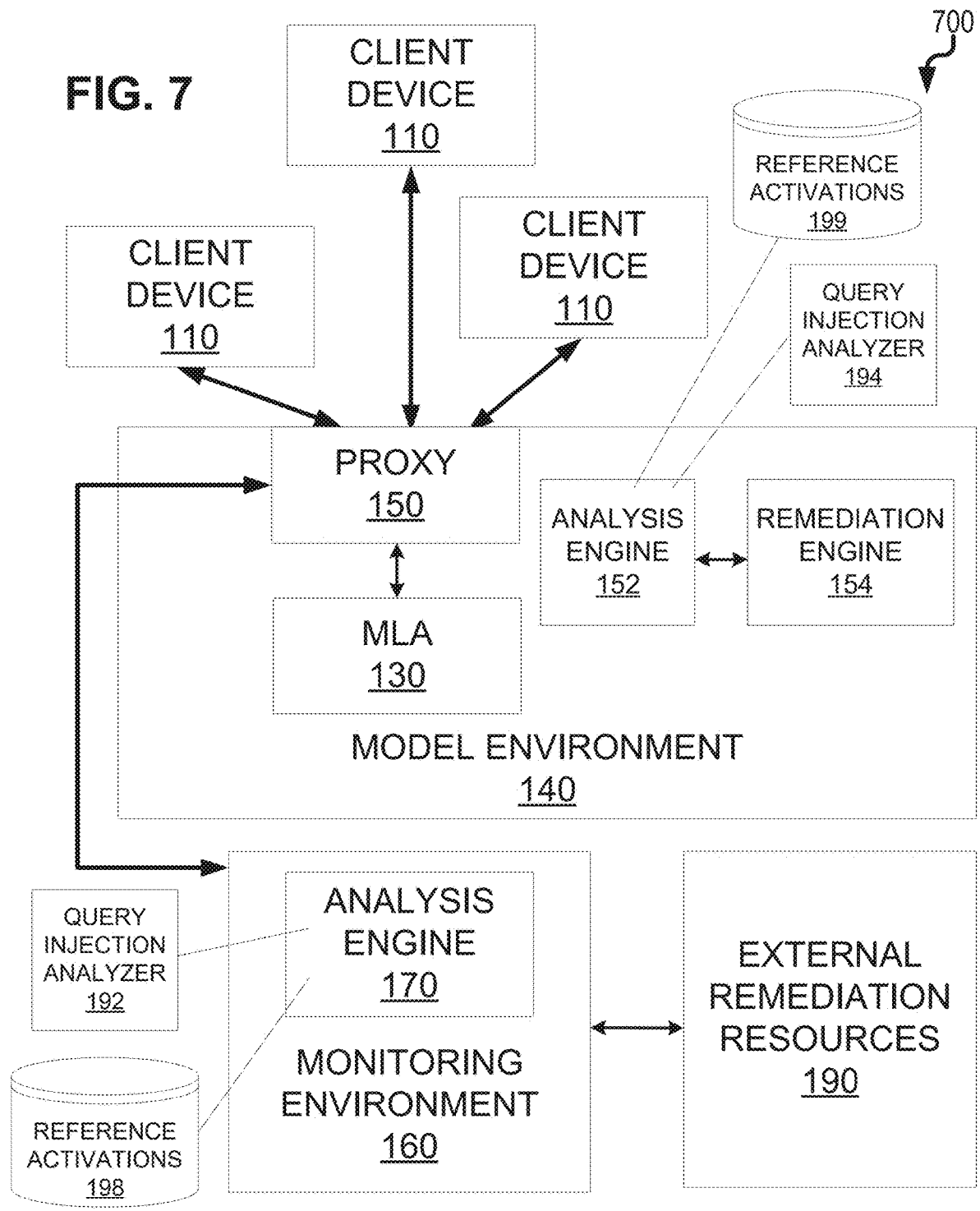
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
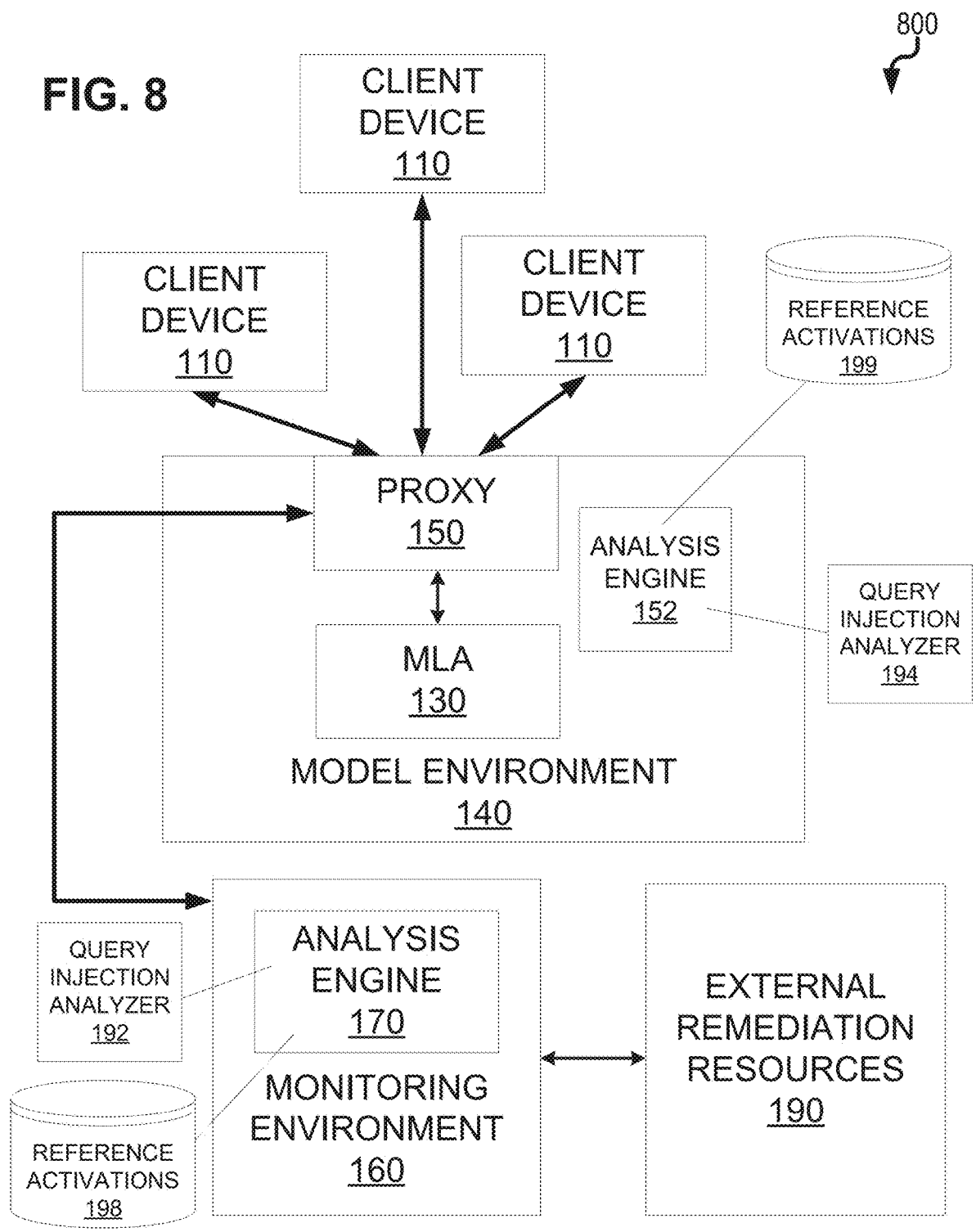
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
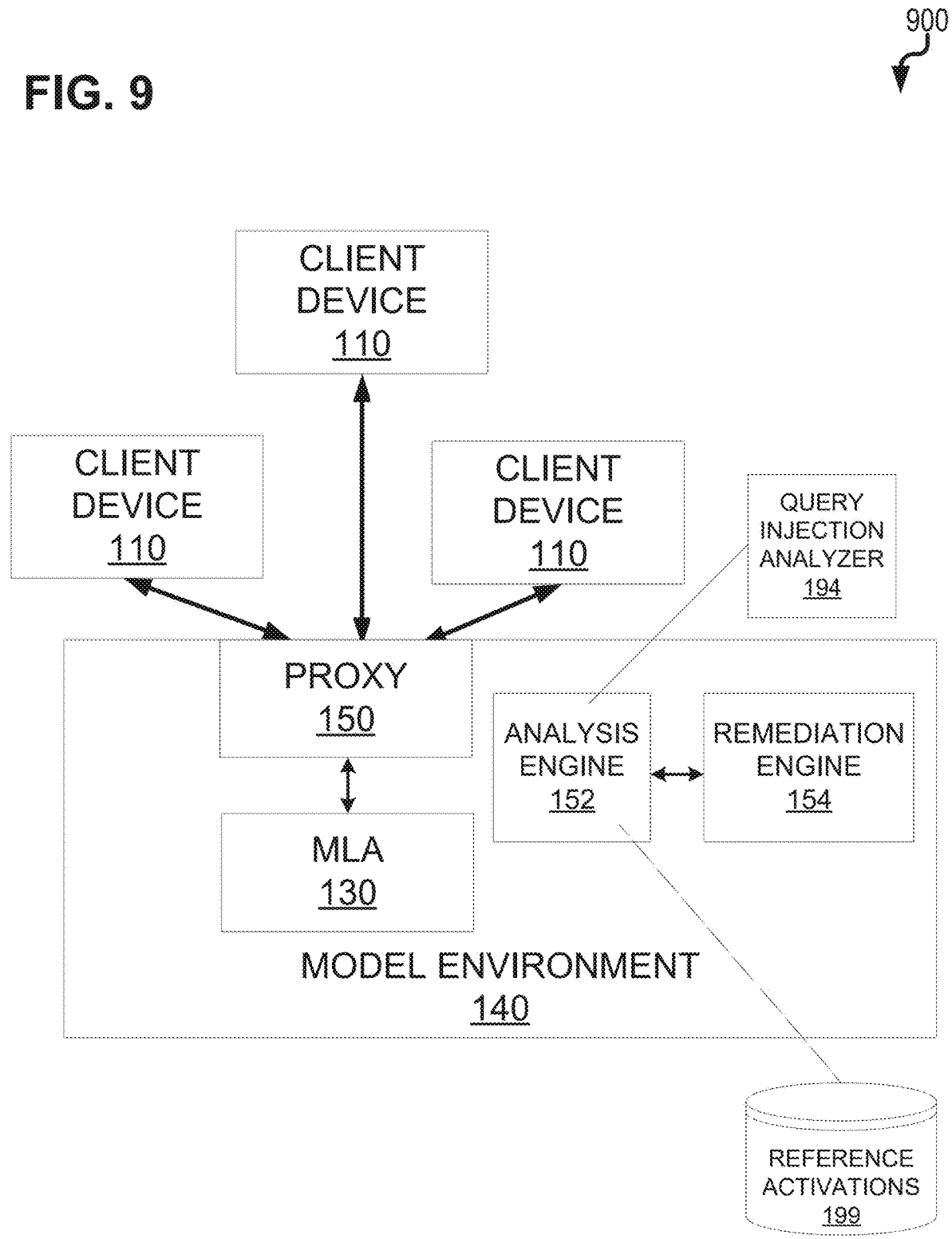
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
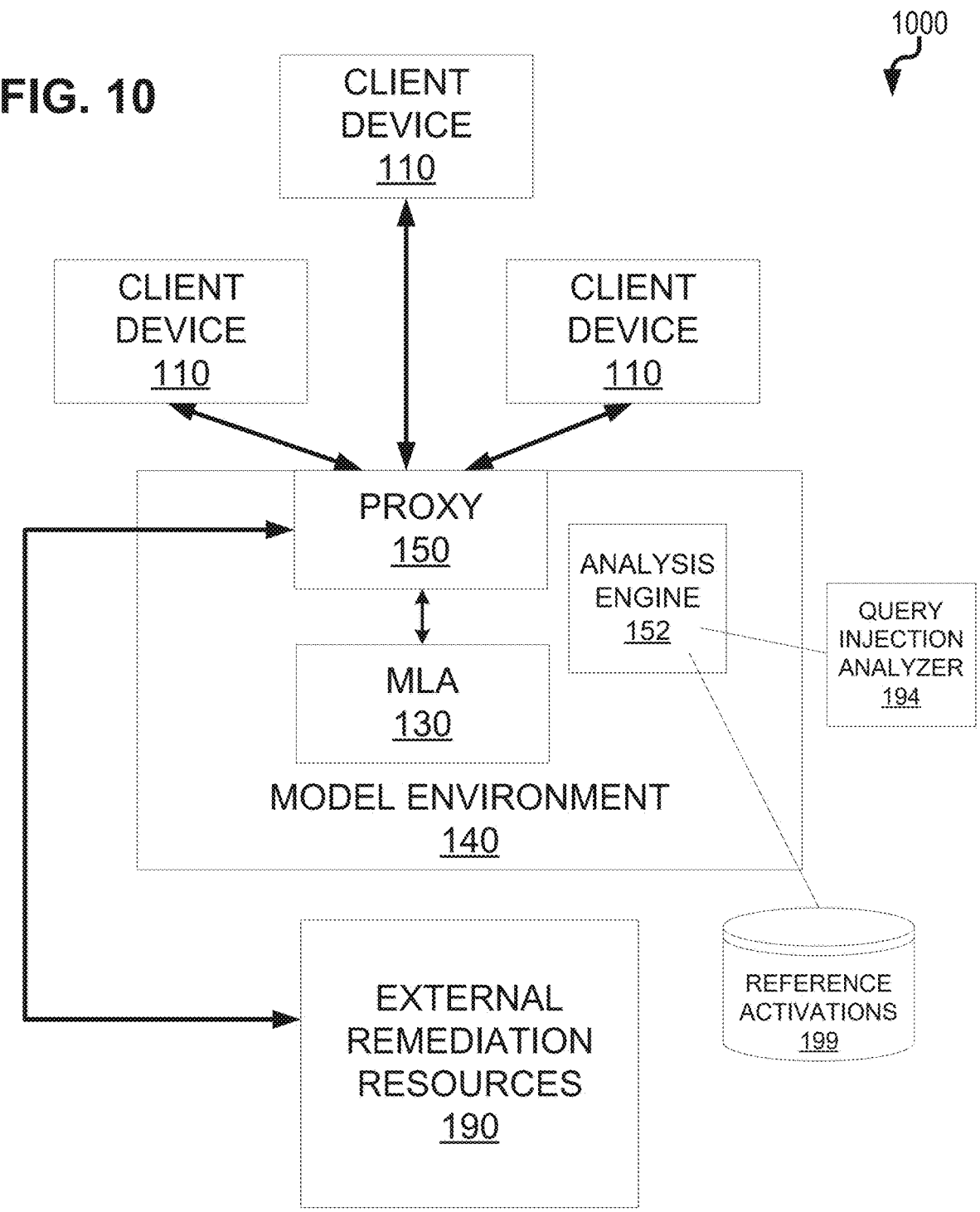
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of queries (e.g., inputs including but not limited to prompts) is conducted local within the model environment 140. Actions requiring remediation are then initiated or otherwise triggered by external remediation resources 190 (which may be outside of the monitoring environment 160) such as those described above.

Figure 11:
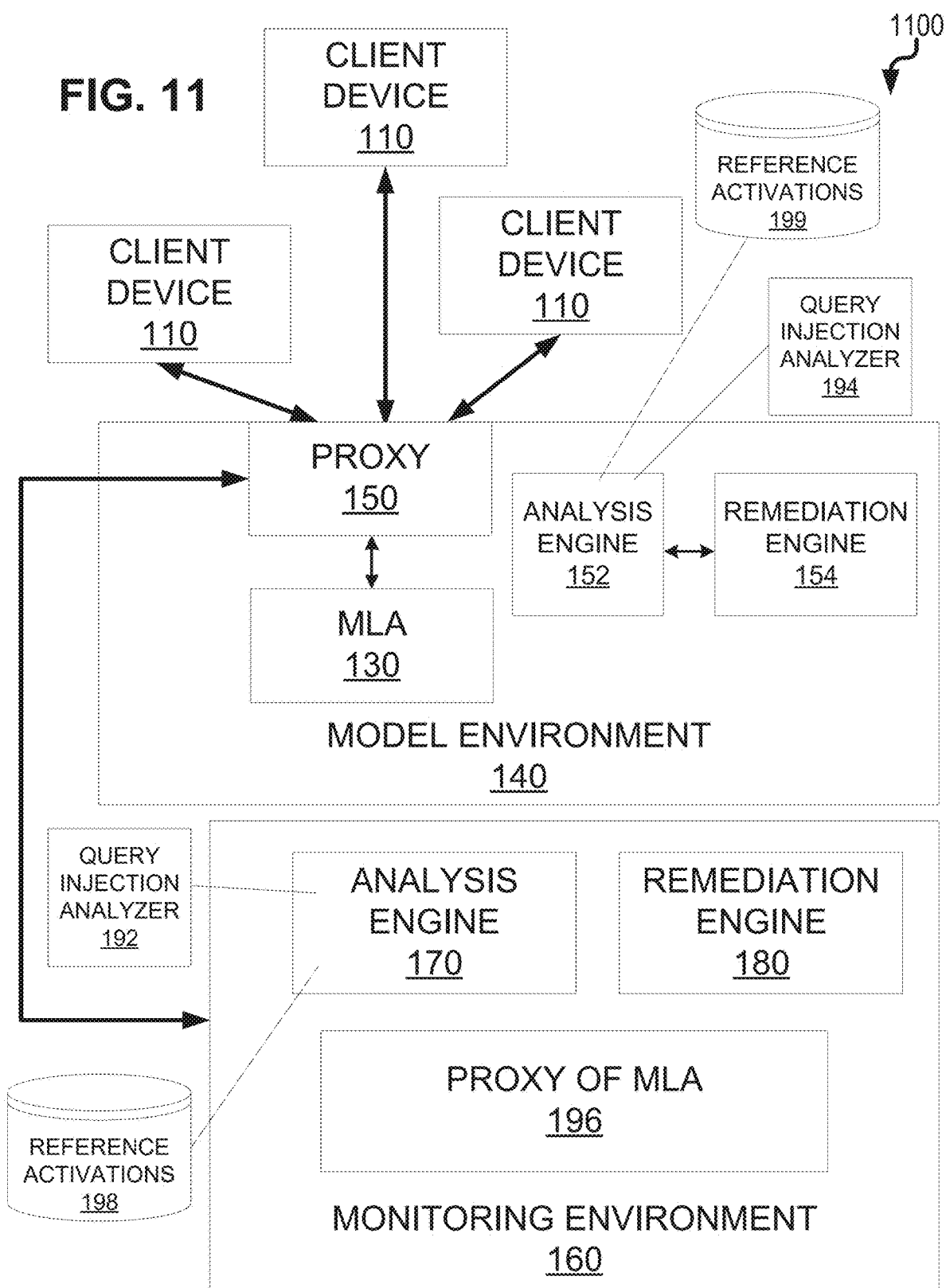
FIG. 11 is a system diagram illustrating a security platform for machine learning model architectures having a model environment which has a proxy of the machine learning architecture.

FIG. 11 is system diagram 11 illustrating a security platform for machine learning model architectures having a configuration in which the model environment includes both a local analysis engine 152 and a local remediation engine 154. The monitoring environment 160, in this variation, can include an analysis engine 170 and a remediation engine 180 as well as a MLA proxy 196 of some or all of the MLA 130. Stated differently, the MLA proxy 196 is a model or series of models that mimic some or all of the behavior of the MLA 130. In this case, the MLA proxy 196 can ingest a query and the output and/or an intermediate result of the MLA proxy 196 can be used by the query injection analyzer 192. Intermediate result can comprise outputs of some or all of layers (prior to the output layer) or other information generated by the MLA 130 before generating a final output. The analysis engine 170 can make a determination of whether to allow the MLA 130 to ingest the query based on an output or intermediate result of the MLA proxy 196.

As indicated above, one or more of the analysis engines 152, 170 can include, execute, or otherwise instantiate a query injection analyzer 192, 194 which, in some variations, comprises a binary classifier which can identify a query as being malicious or benign. In some variations, the query injection analyzer 192, 194 can be a multi-class classifier which can characterize different aspects of a query such as, but not limited to, a level of trustworthiness of the query (e.g. malicious, suspicious, benign, etc.). In some variations, the query injection analyzer 192, 194 can be a multi-class classifier which identifies which of a plurality of different attack types are implicated by an input query. Two or more of these query injection analyzers 192, 194 can form an ensemble of classifiers (i.e., machine learning models). The ensemble of query injection classifiers can be arranged such that two or more of the classifiers are executing in parallel. In other variations, the ensemble of query injection classifiers can be arranged such that two or more classifiers are working in sequence. For example, a binary classifier can first analyze a query to determine whether the query is malicious or benign. If the query is classified as being malicious, a multi-class classifier can analyze the query to determine a particular type of injection attack. This classification by type can be used to take remediation actions which are specifically tailored to the type of attack. Such an arrangement can also be advantageous when the multi-class classifier is more computationally expensive than the binary classifier (which avoids every query being analyzed by the multi-class classifier). Other arrangements can be provided with a lightweight classified being executed by the analysis engine 152 in the model environment 140 and a more computationally expensive model can be executed by the analysis engine 170 in the monitoring environment 160

The query injection analyzer 192, 194 can, in some variations, be a machine learning model such as an XGBoost classification model, a logistic regression model, an XLNet model, an Out of Distribution (OOD) model and the like. In the case of a binary classifier, the query injection analyzer 192, 194 can be trained using a corpus of data which can include a plurality of benign queries that do not contain query injection information and a plurality of malicious queries that contain various character strings (which can include portions of alphanumeric symbols, non-printable characters, symbols, controls, etc.) and the like which encapsulate various sorts of query injection. Malicious queries in this context refer to queries that cause the query injection analyzer 192, 194 to exhibit undesired behavior. Benign queries in this context can refer to queries that do not cause the query injection analyzer 192, 194 to exhibit undesired behavior. In some variations, the queries forming part of the corpus can be labeled with their classification. The model training can be performed by converting the queries into sentence embeddings which can, amongst other features, be used to train the query injection analyzer 192, 194.

The query injection analyzer 192, 194 can in some variations, use a rules engine or a heuristic-based methods to characterize whether a particular query is malicious (i.e., seeks to cause the MLA 130 to behave in an undesired manner, etc.). The query injection analyzer 192, 194 can include different techniques/algorithms in parallel including machine learning-based techniques as well as non-machine learning-based techniques.

In the case of a multi-class classifier, the training corpus for the query injection analyzer 192, 194 can include different sets of queries for each category (i.e., severity level, type of attack, etc.) which are labeled with their category (e.g., security level, type of attack, etc.). The queries can be transformed into sentence embeddings which can be used, amongst other features, to train the query injection analyzer 192, 194.

The query injection analyzer 192, 194 can be periodically retrained as new query injection techniques are identified and/or new remediation tools are created. Such an arrangement is advantageous in that the query injection analyzer 192, 194 can evolve to address the continually changing threat landscape.

After the query injection analyzer 192, 194 has been trained, the analysis engine 152, 170 can preprocess incoming queries so that they are suitable for ingestion by the query injection analyzer 192, 194. For example, the raw/original query is transformed into sentence embeddings and then input into the query injection analyzer 192, 194 which then results in a model prediction. The model prediction for a binary classifier can predict the confidence of the query injection classifier. The output of the model can take varying forms including, for example, a score closer to 1 indicating that the query is malicious and a score closer to 0 is indicating that the query is benign. The model prediction for the multi-class classifiers can identify a category for the query (i.e., a class for which the query injection analyzer 192, 194 has been trained)

The multi-class classifier variation of the query injection analyzer 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the query injection analyzer 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious queries by injecting special case characters randomly or methodically, to confuse the MLA 130 to output a malicious response. A context continuation attack can include providing the MLA 130 with a single query or multiple queries which follow some permutation of a pattern like: benign query, malicious query, benign query, continuation of malicious query and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the query and tasking the MLA 130 to decrypt the query specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the query (e.g., malicious, highly suspicious, unknown, unable to classify, etc.). One remediation activity can be to block the IP address of the requester (i.e., the computing device initiating or otherwise relaying the query/input for ingestions by the MLA 130). The IP address can also be used to filter (i.e., modify or otherwise redact) queries before they are input into the MLA 130. The remediation activities can also include generating alerts (e.g., sysadmin alerts) indicating suspicious/malicious queries. Further, the remediation activities can include capturing system/process behavior associated with suspicious/malicious queries for analytics or other tracking purposes.

In some variations, an intermediate result of the MLA 130 (or a proxy of the MLA 130) can be extracted or otherwise obtained and then used for analysis of the query (statistical analysis and/or query injection classification). The intermediate result can take various forms and be derived from information generated by the MLA 130 prior to it ultimately generating an output (e.g., a classification, etc.).

In some implementations, residual activation analysis can be deployed as a defensive strategy. Specifically, the activations in the residual streams that exist between the layers (e.g., transformer layers, etc.) of a machine learning model (e.g., a deep neural network such as an LLM, etc.) can be analyzed (and form the intermediate result). These residual streams can provide an understanding of how information is processed and propagated through the MLA 130, providing a unique vantage point for identifying and mitigating the effects of query injection attacks. By examining the patterns of these activations, anomalies can be detected that signify a potential attack (e.g., an attack seeking to the MLA 130 to leak private (e.g., sensitive) information, etc.), enabling such threats to preemptively neutralized.

For selected in layers in the MLA 130, neuron activations of benign (i.e., legitimate) queries can be modeled based on either pre-computed or approximated distributions of activations of the training data used by the MLA 130, depending on whether the training dataset is available. In addition, the query injection analyzer 192, 194 can, during inference, monitor activations of queries. The query injection analyzer 192, 194 can compare the distributions of activations from pre-computed references (i.e., reference activations stored in data stores 198, 199) to the activations associated with the monitored queries. If the computed metrics derived from such comparisons return abnormal values, at least one remediation action (e.g., an alarm, etc.) can be initiated (i.e., triggered, etc.). The at least one remediation action can be executed by one or more of the remediation engines 154, 180 or external remediation resources 190.

With the current subject matter, the aim of pre-computing the reference activations (i.e., the reference activations stored in data stores 198, 199) is to model the distribution of activations for legitimate queries. If the training dataset utilized by the MLA 130 is available, the activations can be directedly computed from it, as the training data should serve as a reliable representation of legitimate inputs. Such computation can involve recording or otherwise capturing the activations from certain layers of the MLA 130 and storing such reference activations in one or more of the data stores 198, 199.

In scenarios where the training dataset utilized by the MLA 130 is not accessible, such as when the MLA 130 is implemented by a third party and the trainer does not wish to share private training data, the activations of the training data can be approximated. This approximation can be based on the observation that ML models are typically most confident about the data they are trained on. This arrangement can be leveraged by optimizing the activations to maximize the confidence score with respect to specific class labels (confidence values range from 0 to 1). Such an approach can be based on the tendency for a fully trained model to induce more certain outputs (e.g., in a dog/cat classifier, a typical dog image fed to a model will output a high probability for a dog and low probability for a cat). With the current subject matter, a sub-model can be considered that only considers the subnetwork that starts from the activations of interest all the way to the model output. After initializing the activations (using, for example, techniques described below), the activations can be refined using methods such as gradient ascent so that the outputs become highly certain. Different activations can be learned for inducing highly certain outputs for each of the model's output classes.

Various initialization strategies can be employed including, but not limited to techniques which leverage batch normalization layers. With such techniques, if an ML model forming part of the MLA 130 contains a batch normalization layer, the layer after such batch normalizations layers can be selected. The activations on this layer can be initialized with Gaussian noise N(0,1), as batch normalization layers typically standardize activations to a mean of 0 and variance of 1.

Another initialization strategy can leverage public data. If public data from a distribution similar to the training data used by the MLA 130 is available, activations can be initialized using the public data.

In other cases, random noise can be employed. In particular, activations can be initialized with random noise or pseudorandom noise.

After initialization, various adversarial data generation techniques can be used such as Fast Gradient Sign Method (FGSM), Projected Gradient Descent (PGD) and the like to optimize the activations. While these techniques are traditionally used to craft inputs that mislead ML models, these technique can be adapted to refine activation distributions. As described above, the activations can be refined/adapted such that they maximize the likelihood of any output class. A metric to optimize for then would be the −log(probability of a class ID). The class ID can be varied to collect a diversity of such activations.

Once the reference activations are pre-computed, the MLA 130 can be deployed to accept public queries. The current detection techniques monitor the activations of queries during inference and stores them for analysis. Note that obtaining these activations incurs no or minimal additional computational cost, as they are already computed as part of the normal operation of the MLA 130 for responding to the queries. Periodically, various metrics can be computed by the query injection analyzer 192, 194 to detect whether the queries seek to cause the MLA 130 to behave in an undesired manner (e.g., leak or otherwise reveal private or sensitive information, etc.). A first metric is the Fréchet distance, which measures the overall divergence between the activation distributions of user queries and the pre-computed reference activations. Stated differently, the first metric can provide a measure of similarity between curves that takes into account the location and ordering of the points along the curves. A second metric can be a class-conditioned Fréchet distance (a technique conditioning essentially groups the queries by the class predictions), which groups queries by the class predictions (e.g., benign/malicious and/or type of attack, etc.) and calculates the Fréchet distance for each group of queries relative to the reference activations for the same class.

Empirical results demonstrated that the first metric effectively distinguishes legitimate queries from adversarial ones, while the second metric separates legitimate queries with high similarity (e.g., repetitive patterns found in video surveillance, etc.) from adversarial ones. If the first metric is below a pre-determined threshold, it means the user is querying the MLA 130 with benign queries having high variety. In contrast, the second metric being below a pre-determined threshold (which can differ from that of the first metric) indicates that the user is querying the MLA 130 by many similar but still benign queries. If both distances are above the corresponding thresholds, then the queries may be malicious and one or more remediation actions (such as those described above) can be initiated. Thresholds can be calculated, for example, by constructing benign and adversarial queries and optimizing for a cost function such as the F1 score. Alternatively, one can only construct benign queries and set the threshold to be greater than the distance observed with the benign queries. Other techniques to set decision thresholds can also be used.

In some variations, the query injection analyzer 192, 194 can additionally or alternatively calculate other metrics, such as computing a score similar to the Inception score but using the model to protect (i.e., the MLA 130). The Inception score evaluates the quality of generated data by measuring the alignment of predicted class probabilities with distinct and meaningful categories, ideally having low entropy for individual predictions and high entropy across the dataset. With this arrangement, unlike benign users, adversarial users may query the MLA 130 with maliciously constructed inputs that the MLA 130 does not find familiar, leading to a low "inception" score which can be In the context of privacy attacks, the current subject matter can be used to identify the particular data points targeted by such attacks when the training data is available. In order to make such a determination, pre-computed activations of the training data points can be used. For each point within the training data set, the corresponding activation's k-nearest neighboring activations can be identified and the average distance from the point's activation to its neighbors can be computed. At inference time, the query activations within the MLA 130 are monitored. If a query's activation is too close to a particular training point (i.e., within a pre-defined distance, etc.), the training point can be flagged as potentially having been exploited. The flagging can, for example, be based on whether the distance between the query's activation and the training point's activation is smaller than the training point's average distance to its neighbors. In some variations, if the training point is flagged as potentially exploited more times than a predefined threshold, one or more remediation actions can be initiated (as described above) including raising an alert indicating that the training point is likely being targeted in an attack.

The current subject matter can also be adapted for deployment with LLMs forming part of the MLA 130. There are two main challenges. One challenge in applying the current techniques to LLMs lies in their scale; these models contain a vast number of neurons in each layer, making the computation and comparison of activations inefficient. To address this, a form of surrogate activations can be used that have a lower dimensionality than the activations in each layer of the LLMs. One way to create such surrogate activations is by leveraging a fine-tuning technique for LLMs such as Low Rank Adaptation (LoRA) or quantized Low Rank Adaption (QLoRa), which enables fine-tuning by modifying only a small subset of neurons. Specifically, given a fine-tuned LLM being monitored for privacy attack, the model can be replicated by performing LoRA-based fine-tuning on the foundation model (i.e., the MLA 130). Such a technique eliminates the need to make assumptions about the fine-tuning techniques used in obtaining the model. Further, as the number of neurons in the LoRA reduced model is much smaller than in the LLM, fewer computational resources are used to compute activations of the LoRa reduced model and detect potential privacy attacks. The approach relies on learning a smaller low-complexity surrogate model using LoRA fine-tuning in order to resemble the original fine-tuned LLM (MLA 130). The assumption is that existing foundation models (e.g., Llama, etc) can be fine-tuned using low-rank approximations (LoRA) to obtain smaller models. These models can be trained using similar datasets as the fine-tuned LLM (MLA), so that the LoRA model can serve as a surrogate for the MLA 130. This arrangement makes it easy to calculate the reference activations as well as the query activations as it is obtained with low-complexity.

The second challenge is, different from Cv domain which should have a clear label for the object in the input picture, it is usually difficult to label the input prompts. In this scenario, the task names (more specifically, function call name for the prompts) can be used as the output labels of the input prompts. For example, when GPT is asked about the weather for London, GPT will understand the task and hook the function get_weather_in location (city_name). This aspect is useful in the customized AI powered chatbot system because it is typically connected with state via function calls. By utilizing function names as the input label, the class-conditioned Fréchet distance can be used to detect information leakage in the large language model scenario. Note that when there is a possibly ambiguous prompt which has an ambiguous attempt, multiple models can be used along with a weighted vote to generate the target label. Alternatively or additionally, human labelling (RLHF) can be used. Prompts that include multiple tasks or function calls can be separated or otherwise decomposed into single function call-related prompts.

Figure 12:
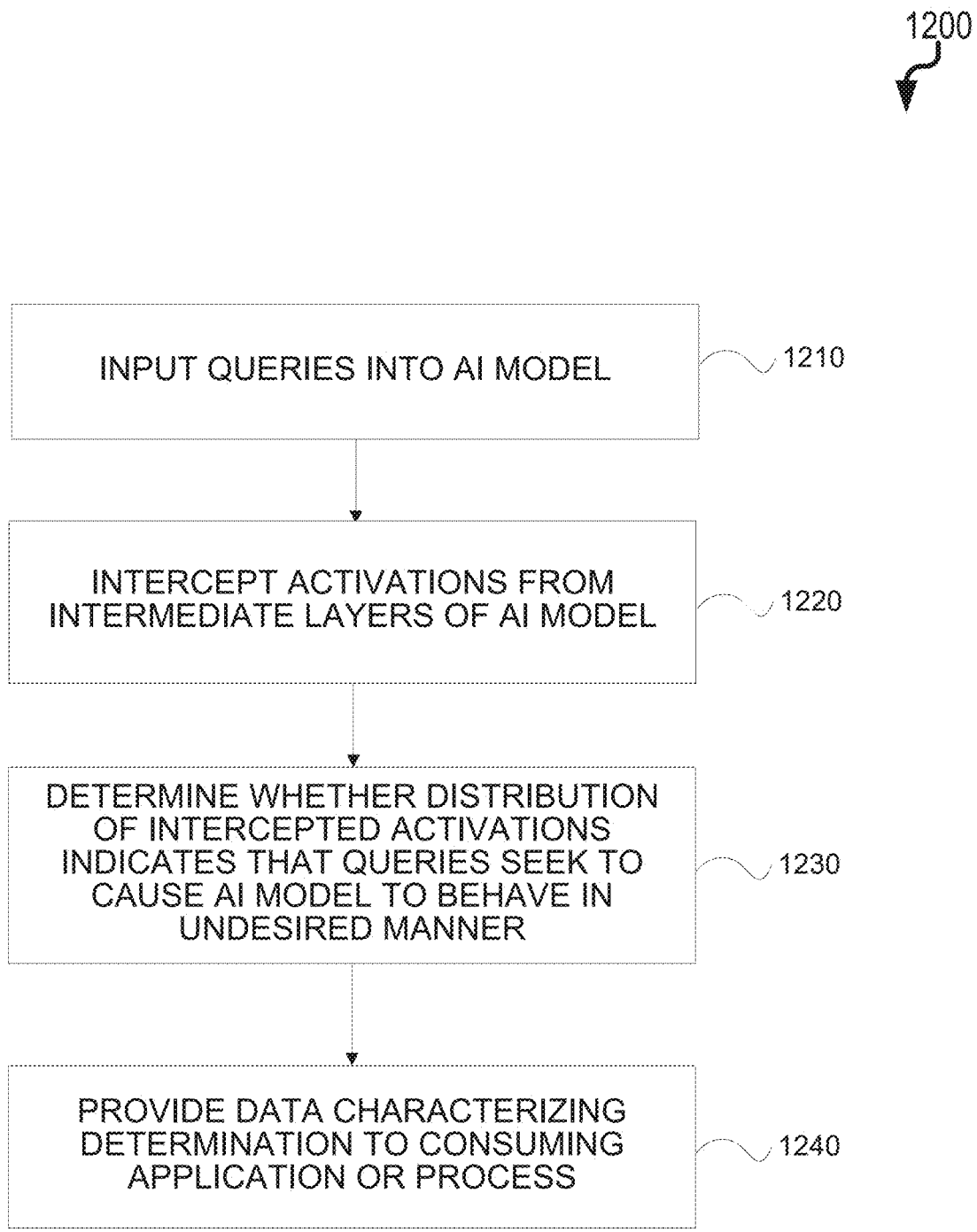
FIG. 12 is a process flow diagram illustrating a technique for analyzing queries of an AI model which examines distributions of query activations relative to reference activations in order to determine whether they seek to cause the AI model to behave in an undesired manner.

FIG. 12 is a diagram 1200 in which, at 1210, each of a plurality of queries into an AI model comprising a plurality of layers including an input layer, an output layer, and at least one intermediate layer between the input layer and the output layer. Each intermediate layer, during inference, outputs a plurality of activations. Activations are intercepted, at 1220 for each query, from at least one of the intermediate layers. It is then determined, at 1230, whether a distribution of the intercepted activations across the queries indicates that the queries seek to cause the AI model to behave in an undesired manner by conducting a distance-based similarity analysis between the intercepted activations and reference activations. Data characterizing the determination can be provided, at 1240, to a consuming application or process.

The consuming application or process can perform various operations. For example, the analysis engine 152 can provide the determination to the remediation engine 154, the analysis engine 170 can provide the determination to the remediation engine 180, the analysis engine 152 can provide the determination to the remediation engine 180, the analysis engine 170 can provide the determination to the external remediation resources 190, the analysis engine 152 can provide the determination to the external remediation resources 190, and/or the determination can be transmitted to or otherwise consumed by a local or remote application or process. The analysis engine 152, 170 in this context can act as a gatekeeper to the AI model by sending information to a consuming application or process which results in preventing subsequent queries from a user from being input and allowing subsequent queries deemed to be safe to be input. In some cases, the consuming application or process flags the query (or queries) as being malicious for quality assurance upon a determination that the query (or queries) elicit undesired model behavior. In some cases, it may be desirable to modify subsequent queries (which can be performed by the consuming application or process) so that they are ultimately non-malicious (i.e., benign). Other actions can be taken based on the IP address of the requester (such as blocking subsequent queries, modifying subsequent queries, etc.). Such an arrangement still provides the attacker with an output/response thereby potentially masking the fact that the system identified the response as being malicious.

Figure 13:
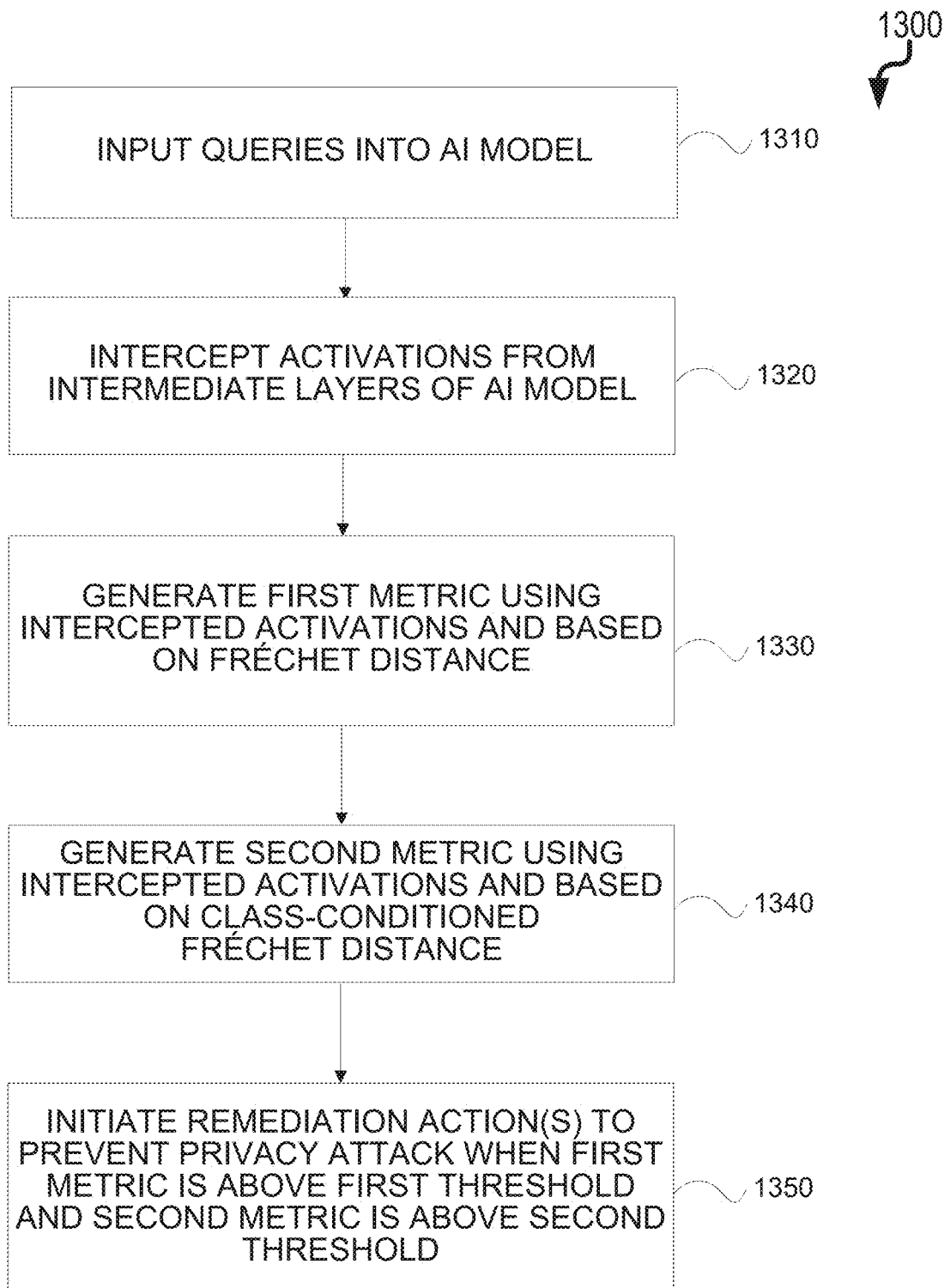
FIG. 13 is a process flow diagram illustrating a techniques for determining whether an AI model is being subject to a privacy attack using Fréchet and class-conditioned Fréchet distances for query activations relative to reference activations.

FIG. 13 is a diagram 1300 in which, at 1310, each of a plurality of queries into an AI model comprising a plurality of layers including an input layer, an output layer, and at least one intermediate layer between the input layer and the output layer. Each intermediate layer, during inference, outputs a plurality of activations. Activations are intercepted, at 1320 for each query, from at least one of the intermediate layers. A first metric is generated, at 1330, based on a Fréchet distance of the intercepted activations relative to reference activations. A second metric is generated, at 1340, based on a class-conditioned Fréchet distance of the intercepted activations relative to reference activations. A remediation action to protect the AI model from a privacy attack is initiated, at 1350, when the first metric is above a first threshold and the second metric is above a second threshold.

Figure 14:
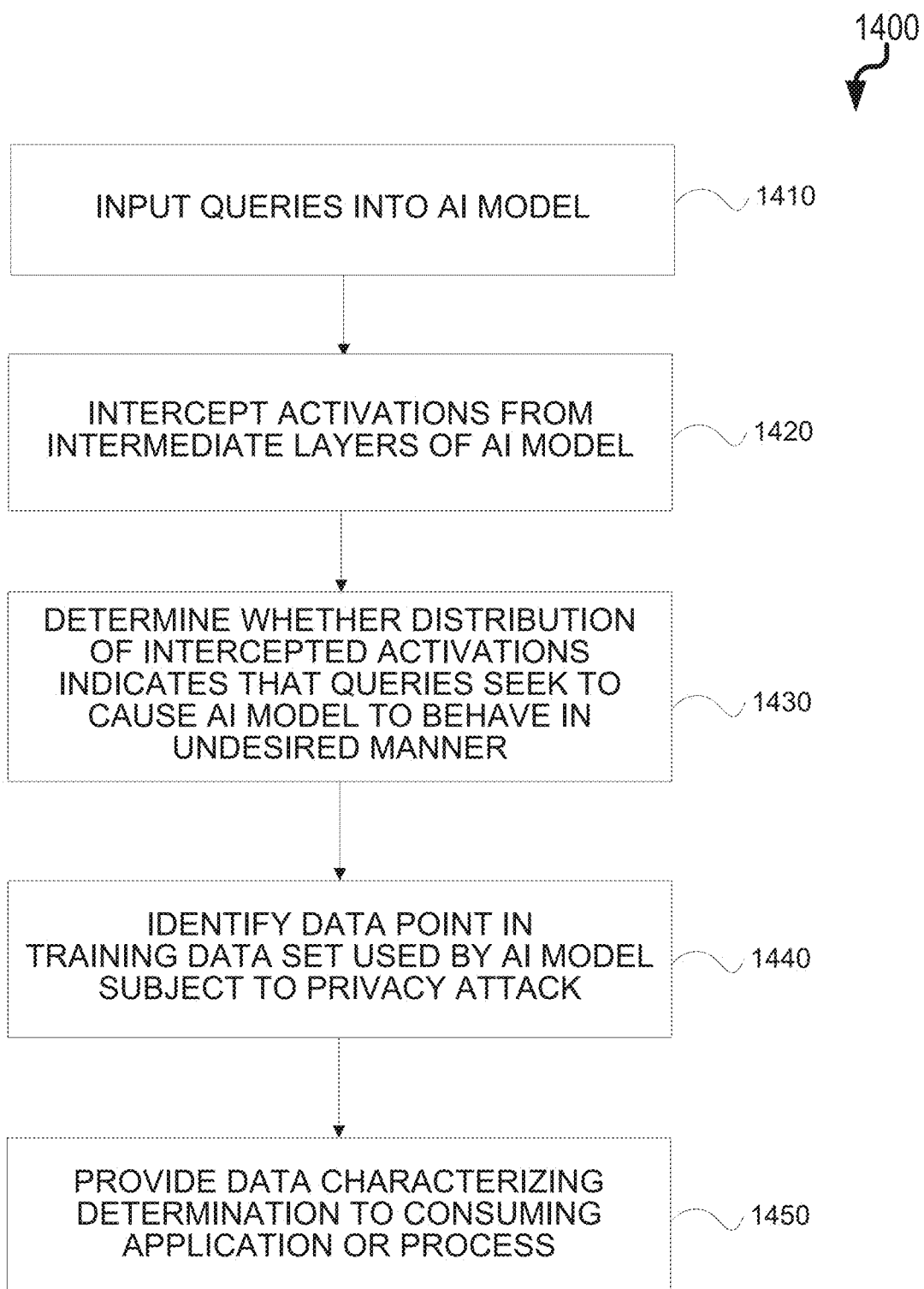
FIG. 14 is a process flow diagram illustrating a technique for determining whether an AI model is being subject to a privacy attack and for identifying particular data points within a training data set which are being targeted by such attack.

FIG. 14 is a diagram 1400 in which, at 1410, each of a plurality of queries into an AI model comprising a plurality of layers including an input layer, an output layer, and at least one intermediate layer between the input layer and the output layer. Each intermediate layer, during inference, outputs a plurality of activations. Activations are intercepted, at 1420 for each query, from at least one of the intermediate layers. It is then determined, at 1430, whether a distribution of the intercepted activations across the queries indicates that the queries seek to cause the AI model to behave in an undesired manner by conducting a distance-based similarity analysis between the intercepted activations and reference activations. Based on this determination, at 1440, one or more data points in a training data set used by the AI model which are subject to a privacy attack are identified. Subsequently, at 1450, data characterizing the identified one or more data points is provided to a consuming application or process.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   inputting each of a plurality of queries into an artificial intelligence (AI) model comprising a plurality of layers including an input layer, an output layer, and at least one intermediate layer between the input layer and the output layer, each intermediate layer, during inference, outputting a plurality of activations;
   intercepting, for each query, activations from at least one of the intermediate layers;
   determining whether a distribution of the intercepted activations across the queries indicates that the queries seek to cause the AI model to behave in an undesired manner by conducting a distance-based similarity analysis between the intercepted activations and reference activations, the distance-based similarity analysis comprising:
   generating a first metric which characterizes overall divergence between the intercepted activations and the reference activations; and
   generating a second metric which groups queries by class predictions and calculates a distance for each group relative to reference activations of a same class; and
   providing data characterizing the determining to a consuming application or process.

2. The method of claim 1, wherein the AI model comprises one or more neural networks.

3. The method of claim 1, wherein the behaving in an undesired manner comprises leaking privacy information originating from a training data set of the AI model.

4. The method of claim 1, wherein the reference activations comprise distributions of activations empirically derived using the AI model.

5. The method of claim 4, wherein the reference activations are generated from queries known to be benign.

6. The method of claim 4, wherein the reference activations are generated from queries known to be malicious.

7. The method of claim 6, wherein the reference activations are further generated from queries known to be benign such that the similarity analysis is conducted relative to both reference activations known to be benign and reference activations known to be malicious.

8. The method of claim 1, wherein the reference activations comprise approximated distributions of activations.

9. The method of claim 8, wherein the approximated distribution of layers are generated using a batch normalization layer initialization strategy.

10. The method of claim 8, wherein the approximated distribution of layers are generated using public data having a distribution similar to a training data set used to train the AI model.

11. The method of claim 8, wherein the approximated distribution of layers are generated by initializing activations with random noise.

12. The method of claim 8 further comprising:
    initializing activations approximating a training data set used by the AI model; and
    optimizing the initialized activations to generate outputs having a likelihood above a pre-defined level.

13. The method of claim 12, wherein the optimizing is performed using one or more adversarial data generation techniques.

14. The method of claim 1, wherein the query comprises a privacy attack and the method further comprises:

identifying a training point in a training data set used to train the AI model as being targeted by the privacy attack.

15. The method of claim 14 further comprising:
identifying, for each training point in the training data set, k-nearest neighboring activations associated with an activation for the training point; and
computing, for each training point in the training data set, an average distance from the activation for the training point to the identified k-nearest neighboring activations;
determining that at least one of the queries includes an activation within the average distance for a particular training point; and
flagging the particular training point as being targeted by the privacy attack.

16. The method of claim 1, wherein the first metric is based on a Fréchet distance and the second metric is based on a class-conditioned Fréchet distance.

17. The method of claim 16, wherein the AI model comprises a large language model, each of the queries comprises a prompt and the method further comprises:
identifying, for each prompt, a function call name associated with the prompt; and
wherein classes used by the class-conditioned Fréchet distance are based on the identified function call names.

18. The method of claim 15, wherein at least one of the first threshold and the second threshold is calculated by constructing benign and adversarial queries and optimizing for a cost function.

19. The method of claim 15, wherein at least one of the first threshold and the second threshold is calculated by constructing benign queries and setting the corresponding threshold to be greater than a distance observed with the benign queries.

20. The method of claim 1, wherein the reference activations comprise surrogate activations having a dimensionality lower than activations associated with the AI model.

21. The method of claim 1, wherein the consuming application or process initiates at least one remediation action based on the provided data.

22. The method of claim 21, wherein the at least one remediation action prevents a subsequent query from being input into the AI model.

23. The method of claim 21, wherein the at least one remediation action flags the query as being malicious.

24. The method of claim 21, wherein the at least one remediation action modifies a subsequent query received from a requester of the queries to be benign.

25. The method of claim 21, wherein the at least one remediation action blocks an internet protocol (IP) address of a requester of the queries.

26. A computer-implemented method comprising:
inputting each of a plurality of queries into an artificial intelligence (AI) model comprising a plurality of layers including an input layer, an output layer, and at least one intermediate layer between the input layer and the output layer, each intermediate layer, during inference, outputting a plurality of activations;
intercepting, for each query, activations from at least one of the intermediate layers;
generating, using the intercepted activations and reference activations, a first metric based on a Fréchet distance;
generating, using the intercepted activations and the reference activations, a second metric based on a class-conditioned Fréchet distance; and
initiating a remediation action to protect the AI model from a privacy attack when the first metric is above a first threshold and the second metric is above a second threshold.

27. A computer-implemented method comprising:
inputting each of a plurality of queries into an artificial intelligence (AI) model comprising a plurality of layers including an input layer, an output layer, and at least one intermediate layer between the input layer and the output layer, each intermediate layer, during inference, outputting a plurality of activations;
intercepting, for each query, activations from at least one of the intermediate layers;
determining whether a distribution of the intercepted activations across the queries indicates that the queries seek to cause the AI model to behave in an undesired manner by conducting a distance-based similarity analysis between the intercepted activations and reference activations, the distance-based similarity analysis utilizing a combination of a Fréchet distance and a class-conditioned Fréchet distance;
identifying, based on the determination, a data point in a training data set used by the AI model subject to a privacy attack; and
providing data characterizing the identified data point to a consuming application or process.

28. A computer-implemented method comprising:
intercepting each of a plurality of queries of an artificial intelligence (AI) model;
inputting the intercepted queries into a surrogate model corresponding to the AI model, the surrogate model comprising a plurality of layers including an input layer, an output layer, and at least one intermediate layer between the input layer and the output layer, each intermediate layer, during inference, outputting a plurality of surrogate activations, the surrogate model being a more compact representation of the AI model;
intercepting, for each query, surrogate activations from at least one of the intermediate layers;
determining whether a distribution of the intercepted surrogate activations across the queries indicates that the queries seek to cause the AI model to behave in an undesired manner by conducting a distance-based similarity analysis between the intercepted surrogate activations and reference surrogate activations; and
providing data characterizing the determining to a consuming application or process.

29. The method of claim 28 further comprising:
initiating, by the consuming application or process, at least one remediation action to prevent the AI model from behaving in an undesired manner.

* * * * *